United States Patent
Logaraj et al.

[11] Patent Number: 6,113,659
[45] Date of Patent: Sep. 5, 2000

[54] FUEL COMPRISING A PETROLEUM HYDROCARBON IN WATER COLLOIDAL DISPERSION

[75] Inventors: Sundaram Logaraj, Waco; Thomas J. Ernzen, Lorena; Antonio Chan Ng, Hewitt; Mark Aldrich Stroder, Frost, all of Tex.; Stephen J. DeCanio, Montgomery, N.Y.; Ronald J. McKeon, Beacon, N.Y.; Shailaja M. Shirodkar, Glenham, N.Y.

[73] Assignee: Akzo Nobel nv, Arnhem, Netherlands

[21] Appl. No.: 09/243,718

[22] Filed: Feb. 3, 1999

Related U.S. Application Data

[60] Provisional application No. 60/080,416, Apr. 2, 1998.

[51] Int. Cl.[7] .............................. C10L 1/32; C08L 95/00
[52] U.S. Cl. .............................. 44/280; 44/301; 44/628; 106/277; 516/43; 516/47; 516/926; 516/928
[58] Field of Search .............................. 44/280; 106/277

[56] References Cited

U.S. PATENT DOCUMENTS

| | | | |
|---|---|---|---|
| 3,497,371 | 2/1970 | Chang | 106/277 |
| 3,519,006 | 7/1970 | Simon et al. | 137/13 |
| 3,630,953 | 12/1971 | Whittier et al. | 252/312 |
| 3,891,586 | 6/1975 | Califano et al. | 260/28.5 |
| 3,997,398 | 12/1976 | Zajic et al. | 195/28 R |
| 4,030,894 | 6/1977 | Marlin et al. | 44/51 |
| 4,193,815 | 3/1980 | Burris | 106/202 |
| 4,265,264 | 5/1981 | Sifferman | 137/13 |
| 4,298,397 | 11/1981 | Burris | 106/274 |
| 4,455,149 | 6/1984 | Satake et al. | 44/51 |
| 4,479,806 | 10/1984 | Funk | 44/51 |
| 4,496,474 | 1/1985 | Reck | 252/311.5 |
| 4,618,348 | 10/1986 | Hayes et al. | 44/51 |
| 4,666,457 | 5/1987 | Hayes, et al. | 44/51 |
| 4,776,977 | 10/1988 | Taylor | 252/314 |
| 4,793,826 | 12/1988 | Hayes et al. | 44/51 |
| 4,821,757 | 4/1989 | Hayes et al. | 137/13 |
| 4,832,747 | 5/1989 | Marchal | 106/277 |
| 4,923,483 | 5/1990 | Layrisse et al. | 44/51 |
| 4,943,390 | 7/1990 | Hayes et al. | 252/355 |
| 4,978,365 | 12/1990 | Gregoli et al. | 44/301 |
| 5,000,757 | 3/1991 | Puttock et al. | 44/301 |
| 5,000,872 | 3/1991 | Olah | 252/314 |
| 5,024,676 | 6/1991 | Moriyama et al. | 44/301 |
| 5,399,293 | 3/1995 | Numez et al. | 252/314 |
| 5,407,476 | 4/1995 | Shuey et al. | 106/216 |
| 5,411,558 | 5/1995 | Taniguchi et al. | 44/301 |
| 5,478,365 | 12/1995 | Nikanjam et al. | 44/280 |
| 5,667,576 | 9/1997 | Chatterjee et al. | 106/277 |
| 5,667,577 | 9/1997 | Chatterjee et al. | 106/277 |

FOREIGN PATENT DOCUMENTS

| | | | |
|---|---|---|---|
| 0 111 983 | 6/1984 | European Pat. Off. | C08L 95/00 |
| 0 732 376 | 9/1996 | European Pat. Off. | C08L 95/00 |
| 0 794 243 | 9/1997 | European Pat. Off. | C10L 1/32 |
| 2 109 333 | 5/1972 | France | C08H 13/00 |
| 2 291 259 | 6/1976 | France | C06D 3/24 |

OTHER PUBLICATIONS

*International Search Report*, dated Aug. 18, 1999.
Abstract, 60166391, dated Aug. 29, 1985.
*Derwent Abstract*, 90–034473/05, Dec. 19, 1989.
*Derwent Abstract*, 90–061215/09, Jan. 12, 1990.
*Derwent Abstract*, 90–166655/22, Apr. 18, 1990.
*Derwent Abstract*, 90–328580/44, Oct. 25, 1990.
*Derwent Abstract*, 91–161150/22, Apr. 23, 1991.

(List continued on next page.)

*Primary Examiner*—Ellen M. McAvoy
*Attorney, Agent, or Firm*—Louis A. Morris

[57] ABSTRACT

A fuel composition comprising a hydrocarbon in water colloidal dispersion including spherical hydrocarbon particles having a mean softening point exceeding about 95° C., and a water soluble dispersion agent comprising a surfactant and stabilizer. The process for the production thereof is disclosed. These dispersions have a median particle size below about 4.5 microns and about 90% of the particles have a mean particle size diameter less than about 60 microns. These dispersions are storage stable, stable towards transportation, and can be pumped and passed through a burner apparatus without destabilizing.

11 Claims, 2 Drawing Sheets

OTHER PUBLICATIONS

*Derwent Abstract,* 91–161151/22, Apr. 23, 1991.
*Derwent Abstract,* 93–068230/09, Feb. 25, 1993.
*Derwent Abstract,* 94–059260/08, Mar. 9, 1994.
*Derwent Abstract,* 94–065655/08, Feb. 17, 1994.
*Derwent Abstract,* 94–094952/12, Feb. 15, 1994.
*Derwent Abstract,* 94–146184/18, May 4, 1994.
*Derwent Abstract,* 94–164259/20, Apr. 19, 1994.
*Derwent Abstract,* 94–167989/21, Mar. 9, 1994.
*Derwent Abstract,* 94–210802/26, Jul. 20, 1994.
*Derwent Abstract,* 95–094082/13, Jan. 20, 1995.
*Derwent Abstract,* 95–126312/17, Feb. 22, 1995.
*Derwent Abstract,* 95–145115/19, Mar. 14, 1995.
*Derwent Abstract,* 95–151901/20, Mar. 20, 1995.
*Derwent Abstract,* 95–151902/20, Mar. 20, 1995.
*Derwent Abstract,* 83–780695/40, Aug. 30, 1983.
*Derwent Abstract,* 84–155140/25, May 11, 1984.
*Derwent Abstract,* 90–204938/27, May 24, 1990.
*Derwent Abstract,* 94–144829/18, Mar. 22, 1994.
*Derwent Abstract,* 84–272420/44, Sep. 19, 1984.
*Derwent Abstract,* 84–284609/46, Oct. 13, 1984.
*Derwent Abstract,* 84–287896/46, Oct. 30, 1984.
*Derwent Abstract,* 84–291425/47, Oct. 12, 1984.
*Derwent Abstract,* 84–297468/48, Oct. 19, 1984.
*Derwent Abstract,* 84–308559/50, Nov. 2, 1984.
*Derwent Abstract,* 85–122416/20, May 9, 1985.
*Derwent Abstract,* 85–160344/27, Jun. 27, 1985.
*Derwent Abstract,* 85–299704/48, Oct. 18, 1985.
*Derwent Abstract,* 86–101815/16, Apr. 16, 1986.
*Derwent Abstract,* 86–183503/29, Mar. 19, 1986.
*Derwent Abstract,* 87–099176/14, Mar. 3, 1987.
*Derwent Abstract,* 87–122733/17, Apr. 23, 1987.
*Derwent Abstract,* 94–211014/26, May 27, 1994.
*Derwent Abstract,* 87–129547/19, Apr. 23, 1987.
*Derwent Abstract,* 87–252484/36, Jul. 29, 1987.
*Derwent Abstract,* 88–332265/47, Nov. 23, 1988.
*Derwent Abstract,* 89–330174/45, Oct. 3, 1989.
*Derwent Abstract,* 89–337195/46, Oct. 9, 1989.
*Derwent Abstract,* 89–374183/51, Nov. 10, 1989.
*Derwent Abstract,* 90–017041/03, Oct. 17, 1990.
*Derwent Abstract,* 90–034470/05, Dec. 19, 1989.
*Derwent Abstract,* 0–034471/05, Dec. 19, 1989.
*Derwent Abstract,* 90–034472–05, Dec. 19, 1989.
*Derwent Abstract,* 94–281940/35, Sep. 21, 1994.
*Derwent Abstract,* 94–347374/43, Sep. 27, 1994.
*Derwent Abstract,* 95–094083/13, Jan. 20, 1995.
*Derwent Abstract,* 95–16095/21, Apr. 18, 1995.
*Derwent Abstract,* 76–64242X, Jul. 10, 1976.
*Derwent Abstract,* 77–46702Y, Jun. 21, 1977.
*Derwent Abstract,* 77–25847Y, Jun. 10, 1977.
*Derwent Abstract,* 77–25848Y, Jun. 10, 1977.
*Derwent Abstract,* 77–25849Y, Jun. 10, 1977.
*Derwent Abstract,* 77–53196Y, Jun. 15, 1977.
*Derwent Abstract,* 77–62021Y, Jul. 18, 1977.
*Derwent Abstract,* 77–76647Y, Sep. 13, 1977.
*Derwent Abstract,* 77–76648Y, Sep. 13, 1977.
*Derwent Abstract,* 78–07472A, Dec. 9, 1977.
*Derwent Abstract,* 78–59053A, Aug. 10, 1978.
*Derwent Abstract,* 80–53840C, Jul. 24, 1980.
*Derwent Abstract,* 82–93005E, Oct. 27, 1982.
*Derwent Abstract,* 94–211015/26, May 27, 1994.
*Derwent Abstract,* 81–87064D, Nov. 3, 1981.

FUEL COMPRISING A PETROLEUM HYDROCARBON IN WATER COLLOIDAL DISPERSION

This application claims priority to the filing date of U.S. Provisional Application 60/080,416, filed Apr. 2, 1998.

BACKGROUND OF THE INVENTION

1. Field of the Invention

The present invention relates to a fuel composition comprising a high softening point hydrocarbon in a water colloidal dispersion, and a method for making it.

2. Description of the Related Art

There are several patents describing the emulsification of viscous petroleum hydrocarbons in water. The main purpose is to reduce viscosity so that the petroleum hydrocarbon can be converted into a liquid form which is easier to transport and convert to power or chemical feedstocks. Using abundant water as one of the ingredients in preparing these dispersions makes these emulsification processes very attractive. Predominantly nonionic or anionic surfactant packages have been used and in some cases cationic surfactants have been used. The surfactant solution in water and the heated petroleum hydrocarbon are brought in contact and subjected to shearing action using a suitable mixing device. Various mixing devices have been used such as simple blenders, gear pumps, colloidal mills, static mixers, and dynamic mixers. Most of the patents describe emulsification of hydrocarbons at ambient pressures. The petroleum hydrocarbons used in these processes include vacuum residues, atmospheric residues, crude oils, etc. The following is a list of examples of such patents:

U.S. Pat. No. 5,411,558
U.S. Pat. No. 5,399,293
U.S. Pat. No. 5,024,676
U.S. Pat. No. 5,000,872
U.S. Pat. No. 5,000,757
U.S. Pat. No. 4,978,365
U.S. Pat. No. 4,923,483
U.S. Pat. No. 4,793,826
U.S. Pat. No. 4,666,457
U.S. Pat. No. 4,618,348
U.S. Pat. No. 4,265,264
U.S. Pat. No. 4,776,977
U.S. Pat. No. 3,997,398
U.S. Pat. No. 3,630,953
U.S. Pat. No. 3,519,006
U.S. Pat. No. 3,497,371

There are a few patents describing emulsification under higher temperatures and pressures. If the hydrocarbon is too viscous it has to be heated to a certain temperature which results in the temperature of the mix consisting of surfactant solution and the petroleum hydrocarbon to be much higher than the boiling point of water. When the temperature of formation of the emulsion is higher than the boiling point of water the system needs to be at higher pressures to prevent water from boiling off and cooling systems are necessary to cool the emulsions below the boiling point of water before the pressures can be released. The examples in these patents indicate that the hardest material that has been emulsified had a softening point of about 50° C. and in another example had a viscosity of 1000 centipoise ("cps") at 100° C. When hydrocarbons having a softening point above 50° C. were used they were either diluted with fluxant oils, softened with solvent, or were powdered and made into a slurry with softer hydrocarbon emulsions. The following is a list of examples of such patents:

U.S. Pat. No. 4,943,390
U.S. Pat. No. 4,832,747
U.S. Pat. No. 4,821,757
EP 0732376A2

Hydrocarbons above a softening point of about 95° C. have not been emulsified by using methods described in the prior art, nor used as a fuel in the form of an emulsion. There is a need for preparing dispersions with hydrocarbons with high softening points in water containing as high a percentage of dispersed hydrocarbon phase as possible. Hard hydrocarbons have been ground into fine powders and dispersed in water as a slurry. These hard hydrocarbon slurries have certain basic differences when compared to an emulsified hydrocarbon in water. Hard hydrocarbon slurries consist of non-spherical ground particles having median particle sizes of about 18 to 32 microns which are several fold higher compared to a hydrocarbon emulsion in water whose particles sizes are less than about 5 microns. Hard hydrocarbon slurries have a higher rate of settlement and much higher viscosity compared to emulsified hydrocarbon dispersions. Moreover, since hard hydrocarbons do not flow, they cannot be characterized in terms of softening point temperatures. The equipment that is needed to make these fine powders and slurries is expensive compared to emulsification equipment. Such hydrocarbons include bottom products obtained from the solvent deasphalting process such as the residual oil solvent extraction process, commonly referred to as the "ROSE" process for recovering various asphaltic materials.

Stringent environmental regulations have created a need for cleaner transportation fuel and a reduction in the use of high sulfur fuel oil. Crude oil is also becoming progressively heavier (lower in API gravity) and higher in sulfur content. The ROSE process upgrades resids by separating the heavy fraction from the lighter fraction using a variety of solvents. A number of feedstocks can be processed through a ROSE unit such as vacuum resid, atmospheric resid, tar sand and other heavy bitumen. The ROSE process produces deasphalted oil and asphaltenes. The deasphalted oil can be used for a variety of purposes. The asphaltenes have a softening point between about 60° C. to about 200° C. The asphaltenes obtained from the deasphalting process are difficult to handle and pump because of their high viscosity and high softening point. The higher softening point also prevents the asphaltenes from being used for road paving purposes without blending with other softer materials. In order to handle and transport asphaltenes a reduction in viscosity is required. One possible solution is to make a liquid form of asphaltenes by preparing a colloidal dispersion of asphaltenes in water which are storage stable, stable towards transportation and stable towards pumping so that the asphaltenes can be used in various applications including use as a liquid fuel.

There appear to be no examples of colloidal dispersions of hydrocarbon materials with a softening point above about 90° C. The above mentioned higher softening point materials have not been previously made into emulsions or used in emulsified form as hydrocarbon fuels.

SUMMARY OF THE INVENTION

In accordance with the present invention, there is provided a fuel composition comprising a colloidal dispersion of hydrocarbon particles in water having a mean softening point in the dispersion above about 95° C. and a water soluble dispersion agent comprising a surfactant and stabilizer.

This invention also relates to novel compositions and methods for converting very heavy hydrocarbons, such as ROSE asphaltenes, Gilsonite asphalt blends and polymer modified asphalts, which are extremely difficult to handle, into a dispersed pumpable form which shows good static and dynamic stability and can be burned as a combustible fuel. The final product is a dispersion which exhibits low viscosity at ambient temperatures, thereby making it readily pumpable.

DESCRIPTION OF THE PREFERRED EMBODIMENTS

The colloidal dispersion comprising the fuel of the present invention includes petroleum hydrocarbon particles having a mean softening point in the dispersion exceeding about 95° C., a dispersion agent and water. The hydrocarbons include materials derived from natural sources of hydrocarbons such as petroleum and coal which may contain minor amounts of non-hydrocarbon material and/or polymers and resins having a mean softening point above about 95° C., such as ROSE asphaltenes, Gilsonite asphalt blends and polymer modified asphalts.

The dispersion agent includes an emulsifier or emulsifiers comprising cationic surfactants in combination with a stabilizer. Ionic surfactants are the main components of the dispersion agent. A viscosity thickening agent also referred to as a dispersion stabilizer is another important component of the dispersion agent. The dispersions include hydrocarbon particles that are substantially spherically shaped, whose median diameter is below about 4.5 microns and about 90% and preferably about 95% of the particles are below about 60 microns. These dispersions are storage stable, stable towards transportation, and stable towards pumping, and show a positive charge. The dispersion agent will usually comprise from about 0.2% to about 2% by weight of the dispersion and the hydrocarbon particles are generally more than 65% by weight of the dispersion. The following are preferred parameters of the composition of the colloidal dispersion of the present invention given in weight %.

| Component | Amount |
| --- | --- |
| Hydrocarbon with softening point of about 70° C. to about 120° C., preferably about 95° C. to about 120° C. | 55% to 75% (preferably, 60% to 70%) |
| Water | 30% to 35% |
| Surfactants | 0.05% to 1.5% |
| Stabilizer | 0.05% to 0.5% |

The advantages of the above dispersions are as follows:

1. The dispersions contain higher softening point hydrocarbons without the addition of solvents or flux which provide significant cost savings.

2. The storage stability of these dispersions for about 3 to 6 months is excellent compared to lower softening point hydrocarbon dispersions in water since the higher softening point hydrocarbon particles unlike soft hydrocarbon particles do not deform and coalesce into bigger particles which causes destabilization of the dispersion.

3. The dispersions can contain a higher percentage of dispersed hydrocarbon phase content and thus minimize transportation costs. Suitable hydrocarbons include ROSE asphaltenes with a softening point above about 95° C.

4. Ease of transportability and use as a combustible fuel.

The softening point is preferably between about 95° C. to about 120° C. The ROSE asphaltenes have a mean softening point of about 60° C. to 200° C. The mean softening point is indicative of the tendency of the material to flow at a designated temperature and is determined by evaporating water from the emulsion and measuring the softening point of the residue in accordance with ASTM Test Method D36. The asphaltenes obtained from the deasphalting process are difficult to handle and pump in view of their high softening point. These hydrocarbons have to be heated to temperatures significantly above their softening points so that the viscosity of the asphaltene, or hydrocarbon is about 50–500 centipoise before emulsification. This would increase the temperature of the resulting dispersion in water much above the boiling point of water. Therefore, elevated pressure above the vapor pressure of the material being produced is required to prevent water from boiling off. The elevated pressure is necessary during the emulsification process.

A careful selection of surfactants and additives is necessary to ensure that the dispersion agents will be capable of emulsifying the asphaltenes and also stabilize the dispersions at these high temperatures.

The dispersion agents used to produce the dispersions of the present invention comprise: a) water soluble surfactants, also referred to as emulsifiers, and b) stabilizers. Cationic surfactants with the following general formula can be used in these dispersions.

$R_1$=—$C_{14-20}H_{24-40}$, —$C(O)C_{13-19}H_{22-38}$
$R_2$=—$CH_3$, —H, —$CH_2CH_2OH$
$R_3$=—$CH_3$, —H, —$CH_2CH_2OH$
$R_4$=—$CH_3$, —H
m=2 or 3
n=0 to 4

The surfactant molecules have at least one alkyl substituent with a hydrocarbon chain length distribution of about 14 to 20 carbon atoms. The molecules also have one or more amine functionality which serves as the hydrophilic sites in the molecule. These surfactants result in dispersions which show a positive charge in the particle charge test (ASTM D 244). Surfactants can be used at a dosage level of from about 0.2% to about 1.5% by weight of the emulsion.

Suitable cationic surfactants include 60% tallow diamine+40% tallow primary amine; 75% othoxylated tallow diamine quaternary ammonium chloride+25% lignin amine; tallow di-quaternary ammonium chloride; 67% tallow mono-quarternary ammonium chloride+33% lignin amine; and 67% tallow di-quaternary ammonium chloride+33% lignin amine.

Suitable anionic surfactants include 75% tallow mono-quarternary ammonium chloride+25% lignin amine; tallow diamine; 60% tallow diamine+40% lignin amine; dodecyl-benzene sulphonate; and crude tall oil fatty acids.

Polymeric compounds which enhance stability by various factors including viscosity modification of the continuous phase are suitable for use and can be used as stabilizers in the dispersions of the present invention. Such compounds include hydrophobically modified water soluble polymers such as ethyl hydroxy cellulose, acrylamides and ethoxylates. Suitable stabilizers also include the lignin amines which are chemically modified lignins, guar gum, xantham gum and starches. These stabilizers are used in combination with the surfactants to serve as dispersion agents in the dispersions of the present invention. These additives enhance the storage stability of the present dispersions. Stabilizers can be used at a dosage level of about 0.05% to about 0.5% and preferably about 0.05% to about 0.15% by the weight of the emulsion.

It is important to note that the composition of the present invention comprises hydrocarbon particles having a mean softening point as they exist in a water dispersion exceeding about 95° C. This is distinguished from hydrocarbon particles which may have a softening point exceeding about 95° C. in a pure state, but when incorporated into a water dispersion with fluxant oils or solvents or powdered and made into a slurry with softer hydrocarbon emulsions will have a mean softening point below 95° C.

The process for producing the dispersions comprising the fuel of the present invention comprises:

(a) introducing an aqueous solution of a dispersion agent comprising a surfactant and a viscosity stabilizer at a temperature of about 80° C. to the boiling point of the solution into a high shearing action mixing device such as a high shear colloid mill;

(b) At the same time, a high softening point hydrocarbon heated to above a temperature of about 200° C. to reduce its viscosity to about 50 to 500 centipoise is introduced into the shearing device, such that the action of this device produces highly dispersed hydrocarbon particles in water having a mean particle size of 4.5 microns and less than 10% and preferably less than 5% of the particles are over 60 microns and wherein the pressure is maintained above the vapor pressure of the dispersion being produced;

(c) cooling the dispersion to a temperature below the boiling point of water and preferably to about 90° C.; and (d) reducing the pressure to atmospheric.

The softening point of hydrocarbons in the dispersion is preferably between about 95° C. to about 120° C. and 90% of the hydrocarbon particles will have a diameter less than 60 microns with a preferred median particle diameter below about 4.5 microns.

The process for producing the dispersions of the present invention can be a continuous process using a modified emulsion plant. The modified laboratory emulsion plant has the capability of establishing a pressure of 85 to 120 psi at the outlet of the colloid mill before introduction of the high softening point hydrocarbon.

The high softening point hydrocarbons are maintained at a temperature above 200° C. The surfactants are dissolved in about 30–35 weight % water. The aqueous solution is adjusted to an acid pH of about 2 to 6. A viscosity stabilizer is added to the solution. The temperature of this solution is maintained from about 80° C. to the boiling point of the solution for use in emulsion preparation.

Figure 1:
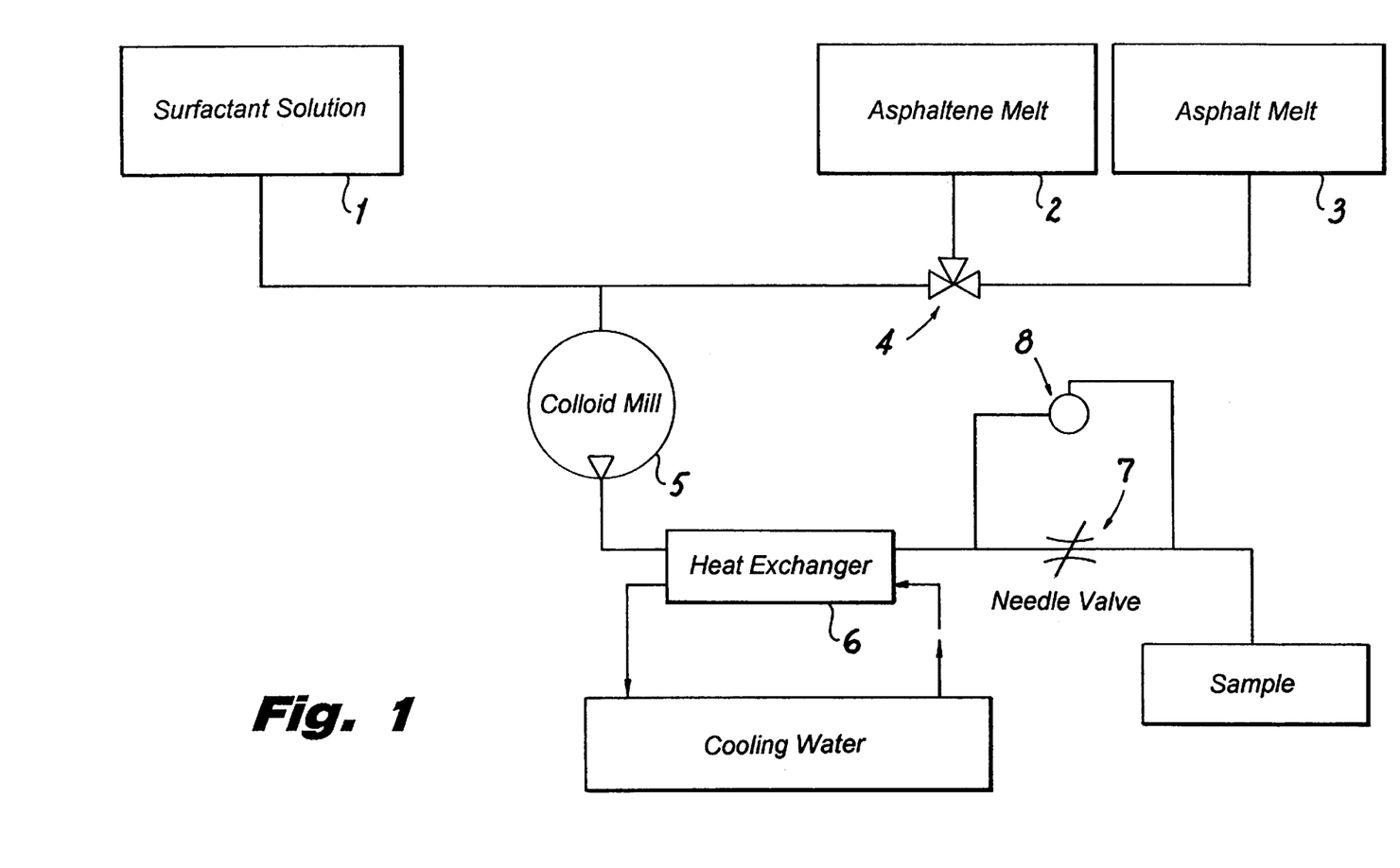
FIG. 1 is a flow diagram describing the process to produce dispersions of petroleum hydrocarbons having a softening point above about 95° C.

With reference to FIG. 1, which shows a modified emulsion plant, the process can be started by introducing the dispersion agent, also referred to as a "hot soap" solution, having a temperature from about 80° C. to the boiling point of the solution from tank 1 into colloid mill 5. Asphaltenes from melt tank 2 heated to a temperature of about 195–230° C. are then introduced into the colloid mill to produce a dispersion of asphaltenes in water. Then melted normal asphalt is introduced from tank 3 into mill 5 along with the soap solution to produce a normal asphalt in water emulsion. Once the desired pressure at the outlet of colloid mill 5 is established melted normal asphalt is switched with the melted asphaltenes from tank 2. Three way valve 4 is employed to effect the switch between tanks 2 and 3. The emulsification temperature is maintained at about 90° C. to 170° C. preferably about 120° C. to 170° C. and most preferably 150° C. to 170° C. in colloid mill 5. The colloid mill creates a dispersion of high softening point hydrocarbon droplets in water. The hydrophobic hydrocarbon chains of the surfactant dissolve in the hydrocarbon droplets of the emulsion. The charged hydrophilic sites of these surfactants have an affinity for water and stay at the surface of the hydrocarbon droplets. The electrostatic repulsion between the like charges on the surface of the two droplets plays a major role acting as barriers in preventing the coalescence of these droplets which would result in separation of these two phases. Preferably, the pressure may be maintained at about 85 psi to 120 psi by passing the emulsion flow backwards through centrifugal pump 8 which creates the desired pressure by pumping against the direction of liquid flow. Although the pressure is created at the outlet of heat exchanger 6, the pressure actually controlled would be that at the outlet of colloid mill 5. The dispersions pass through cooling units 6 which cool the dispersions to a temperature below about 90° C., and preferably about 30° C. to 85° C. before the pressure is released at the outlet of the cooling units 6. Alternatively, restricting valve 7 may be adjusted to create the desired pressure at the outlet of colloid mill 5.

By "substantially spherical" with regard to the hydrocarbon droplets, what is meant is the spherical orientation that is assumed at the high temperatures in the colloid mill which may be perfectly spherical or deviate to some extent such as to an ellipsoidal shape. The shape will be retained when the emulsion is cooled, even when subjected to conditions of high shear such as when being pumped.

The benefits and the advantages of the process include:

1. This is a novel two step high pressure emulsification/ dispersion process. The higher softening point hydrocarbons of about 95° C. to 120° C. have to be heated to a higher temperature compared to soft hydrocarbons (above about 200° C.) which results in a temperature which is higher than the boiling point of water for the mixture of hydrocarbon and surfactant solution. In such cases a pressurized system is necessary to prevent water from boiling off. In a conventional one step continuous emulsification system there is no pressure at the beginning of the emulsification process. The flow of emulsions is necessary to create the required pressure. Hard hydrocarbons in the molten state when mixed with surfactant solution immediately solidify due to evaporation of water and cooling since there is no pressure at the beginning of the emulsification process. This clogs the whole system and prevents any further emulsification. In the present process, in the first step a pressure of about 85 to about 120 psi is established at the outlet of the colloid mill. In the second step high softening point hydrocarbons heated to elevated temperatures of above are introduced into the colloid mill substituting normal asphalt.

2. In the case of higher softening point hydrocarbons it is important that the mill temperature be sufficiently above the softening point of the hydrocarbon so that when the hydrocarbons at elevated temperature are contacted with the surfactant solution in water the hydrocarbon temperature does not drop below its softening point. Failure to maintain the hydrocarbons at a sufficiently high temperature could result in hydrocarbons reaching the mill becoming cooled and attaining a viscosity which is below the limit for emulsification. This clogs the system and prevents any further emulsification. In the present process the system is "seasoned" by raising the temperature of the colloidal material to a temperature in between the temperature of the surfactant solution and the final emulsification temperature by producing a normal asphalt emulsion before introduction of the high softening point hydrocarbons.

3. Not all surfactants, especially the non-ionic surfactants, have the necessary emulsification capability at temperatures much above the boiling point of water and also do not provide the necessary stability to the dispersions at those temperatures. Even among ionic surfactants only certain surfactants were identified to be capable of emulsifying and protecting the high softening point hydrocarbons at the emulsification temperatures (150±15° C.).

The liquid dispersion of high softening point hydrocarbon particles makes it very convenient to transport, store and use as a combustion fuel. Thus, movement of the dispersion can be easily accomplished by pumping the liquid dispersion through a suitable pipeline to the end use location, or storing it in tanks or other suitable storage vessel from where the liquid dispersion can be conveniently distributed when ready for use. Transportation can also be conveniently effected by railroad tank car or trucks.

The asphaltenes used in the following experiments were obtained from Isobutane deasphalting, via the ROSE process, of a heavy Middle Eastern Crude. The properties of the asphaltenes that were used in the examples of the present invention are listed in Table 1.

TABLE 1

Properties of Asphaltenes

| | Asphaltene, #1 | Asphaltene, #2 |
|---|---|---|
| Ring and Ball Softening Point, °C. | 96 | 118 |
| Density, g/mL | 1.10 | 1.10 |
| Sulfur, weight % | 5.4 | 6.0 |
| Nitrogen, weight % | 0.8 | 0.5 |
| Carbon, weight % | 84.4 | 85.0 |
| Hydrogen, weight % | 8.9 | 8.5 |
| Oxygen, weight % | 0.5 | — |
| $nC_7$ insoluble Asphaltenes wt % | 34 | 24.4 |
| Nickel, ppm | 120 | 61 |
| Vanadium, ppm | 400 | 243 |

The following tests were designed to evaluate the storage stability, transportation stability, and stability towards pumping of the dispersions.

Storage Stability

The natural tendency of the dispersions is to separate into two phases by the process of coalescence of the asphaltene particles. There are two factors which prevent this type of coalescence. First, the hydrophilic sites of the surfactants stay at the surface of the asphaltene droplets. These provide a net positive charge for the asphaltene particles in the case of a cationic dispersion. The electrostatic repulsive force between positively charged droplets provides a barrier for coalescence. Second, since the asphaltene particles are spherical solids, at ambient temperatures they do not deform as in the case of liquids, wherein two particles can more easily coalesce into one bigger particle. Thus the hardness of the hydrocarbons provide higher storage stability to its dispersions compared to soft hydrocarbon dispersions. The following tests were used to test the stability of the emulsion.

a. Particle Size Distribution

The particle size distribution represents a measure of the colloidal nature of the dispersions. If the particle size distribution is outside the range of a median below about 4.5 microns and 90% of particles being less than about 60 microns the dispersions will not be storage stable.

b. Storage Stability Test

The storage stability test is performed by pouring the dispersion from the colloid mill into a 500 milliliter graduated cylinder and letting it stand for 24 hours. The difference in the percent asphaltene residue between the top 50 milliliters and the bottom 50 milliliters is measured. The lower the difference the better is the stability of the dispersion. A difference of less than from about 3 to 4% hydrocarbon is considered acceptable.

c. Sieve Test

In the sieve test a 100 grams of dispersion is filtered through a 4 inch by 4 inch #20 mesh (0.85 mm) tared wire sieve. The amount of residue on the screen reflects the stability of the dispersion. Hydrocarbons that are not emulsified and broken dispersions show large amounts of residue on the sieve. A residue below about 1% is considered to pass the sieve test.

d. Transportation Stability—Shaker Test

The dispersions once produced need to be transported in order to be used for certain purposes. A shaker test was designed to simulate the conditions of transporting in a tank truck. 100 grams of dispersion are shaken in a Burrell Wrist Action Shaker for 24 hours. The dispersions are then filtered through a #50 mesh screen. The amount of broken dispersion or residue on the screen and in the bottle gives a measure of its stability towards transportation. A dispersion which gives a residue below 1% of the weight of the dispersion is considered to pass the shaker test.

e. Stability Towards Pumping—Pump Test

The dispersions should be stable when pumped in order to be transported to a desired location. The object of this invention is to create a liquid form of high softening point hydrocarbon in water dispersion that can be stored, transported, and pumped. In the pump test the dispersion is pumped using a progressive cavity pump running at a speed of 500 rpm. About 2000 grams of dispersion is first filtered through a 50 mesh screen and then placed in one of two reservoirs. The dispersion is pumped through a #50 mesh screen from one reservoir to the other over a period of about 18 minutes. A dispersion which can be pumped for 18 minutes and collects less than 10 grams residue on the screen is considered to pass the pump test. The pump test is designed to simulate test conditions that are more severe than what would be encountered in the field.

f. Long Term Stability

Samples of prepared emulsions are stored at room temperature in glass jars. The stability is measured by the sieve test during 3, 7, 14 and 28 day intervals. If the residue is less than 1%, then the test is carried on to completion at 28 days.

g. Residue Determination

To determine % residue a sample of dispersion is weighed and evaporated at a temperature of about 130–150° C. to remove all the water. The resulting residue is weighed and the percent hydrocarbon residue is calculated.

The above Storage Stability and Sieve Tests and % Residue Determination are conducted according to ASTM D244 test procedures for testing dispersed asphalts.

The invention will be further illustrated with reference to the following specific examples. All parts and percentages are by weight unless otherwise noted. It is understood that these examples are given by way of illustration and are not meant to limit the disclosure or the claims which follow.

EXAMPLE 1

Asphaltene #1 was melted in drums using a drum heater belt and then poured into an asphaltene reservoir and heated to 215° C. in a colloid mill. An aqueous soap solution was prepared containing 0.05% guar gum and 1.5% surfactant 1, which is 75% tallow mono-quaternary ammonium chloride+ 25% lignin amine. The pH of this solution was adjusted to 3 using 36% hydrochloric acid. The soap solution was added to the soap reservoir and heated to 88° C. The pipes in the mill were heated to 215° C. and the mill heated to 88° C. When the temperatures reached steady conditions, the recirculating asphalt and soap pumps were started. The mill was turned on followed by passing of the soap solution into the mill at a set flow rate of about 1–3 gallons per minute. The mill gap was set to 0.012 inches in order to produce the desired particle size distribution of asphaltene particles in water having a mean particle size of 4.5 microns and less than 10% and preferably less than 5% of the particles being over 60 microns. Initially asphalt was introduced into the mill followed by introduction of the asphaltenes at a flow rate of about 1–3 gallons per minute. The dispersion was collected after production reached steady state conditions, and then allowed to cool. Residue analysis was done to determine the asphalt content. The asphaltene content for this run was 69%.

EXAMPLE 2

Asphaltene #1 was melted in the drums using a drum heater belt and then poured into an asphaltene reservoir and heated to 215° C. in the colloid mill. The soap solution was prepared by first dissolving 0.05% guar gum in water followed by dissolving 1.5% of Surfactant 1. The pH of this solution was adjusted to 3 using 36% hydrochloric acid. The soap solution was added to the soap reservoir and heated to 88° C. The pipes in the mill were heated to 215° C. and the mill heated to 88° C. When the temperatures reached steady conditions, the recirculating asphalt and soap pumps were started. The mill was turned on followed by passing of the soap solution into the mill at 1–3 gallons per minute. The mill gap was set to 0.012 inches to produce the same particle size distribution as in Example 1. Initially asphalt was introduced to the mill followed by introduction of the asphaltenes at 1–3 gallons per minute. The dispersion was collected after a few seconds and then allowed to cool. Residue analysis was done to determine the asphalt content. The residue was found to be 66%.

EXAMPLE 3

Asphaltene #2 was melted in the drums using a drum heater belt and then poured into the asphaltene reservoir and heated to 225° C. in the colloid mill. The soap solution was prepared by first dissolving 0.5% Surfactant 2, which is tallow diamine, in water at a temperature of about 65° C. The pH of the soap solution was adjusted to 2.1 using 36% hydrochloric acid. Then 0.05% guar gum was dissolved in this soap solution. The soap solution was added to the soap reservoir and heated to 92° C. The pipes in the colloid mill were heated to 220° C. and the mill was heated to about 90° C. When the temperatures reached steady conditions, the recirculating asphalt and soap pumps were started. The colloid mill was turned on followed by passing of the soap solution into the mill at 1–3 gallons per minute. The mill gap was set to 0.012 inches to produce the same particle size distribution as Example 1. Initially asphalt was introduced to the mill followed by introduction of the asphaltenes at a flow rate of 1–3 gallons per minute. The dispersion was collected after a few seconds and then allowed to cool. Residue analysis determined the asphalt content to be 69%.

EXAMPLE 4

Asphaltene #1 was melted in the drums using a drum heater belt and then poured into the asphaltene reservoir and heated to 215° C. in the colloid mill. The soap solution was prepared by dissolving 1.0% of Surfactant 1 in water. The pH of this solution was adjusted to 3 using 36% hydrochloric acid. 0.05% guar gum was dissolved in the solution. The soap solution was added to the soap reservoir and heated to 88° C. The pipes in the colloid mill were heated to 215° C. and the mill was heated to 88° C. When the temperatures reached steady conditions, the recirculating asphalt and soap pumps were started. The colloid mill was turned on followed by passing of the soap solution into the mill at a flow rate of 1–3 gallons per minute. The mill gap was set to 0.012 inches to produce the same particle size distribution as Example 1. Initially asphalt was introduced to the mill followed by introduction of the asphaltenes at a flow rate of 1–3 gallons per minute. The dispersion was collected after a few seconds and then allowed to cool. Residue analysis determined the asphalt content to be 67%.

The asphaltene dispersions produced were subjected to the tests outlined in sections a. to g. The particle size distribution of the dispersions were analyzed using a Coultor LS-130 particle size analyzer.

Results for the above tests are shown in Table 2.

TABLE 2

| Example | Asphaltene | Soap/ Concentration | % Residue | Pump Test 18 min <5 g residue | Storage Set | Sieve Test (%) <1% limit | Median Particle Size, microns | Shaker (%) |
| --- | --- | --- | --- | --- | --- | --- | --- | --- |
| 1 | #1 | Surfactant 1, 1.5% guar gum 0.05% | 69 | Pass, 2.9 g | 1.7 | 0.1 | 2.68 | 0.1 |
| 2 | #1 | Surfactant 1, 1.5% guar gum 0.05% | 66 | Pass, 2.1 g | 3 | 0.03 | 2.55 | 0.1 |
| 3 | #2 | Surfactant 2, 0.5% guar gum | 69 | Pass | NA | <0.1% | 1.7 | NA |

TABLE 2-continued

| Example | Asphaltene | Soap/ Concentration | % Residue | Pump Test 18 min <5 g residue | Storage Set | Sieve Test (%) <1% limit | Median Particle Size, microns | Shaker (%) |
|---|---|---|---|---|---|---|---|---|
| 4 | #1 | 0.05% Surfactant 1, 1.0% guar gum 0.05% | 67 | Pass | 2.8 | 0.06 | 2.54 | 0.3 |

Further tests were run on the dispersions of Examples 2 and 4 to determine long term stability of undisturbed samples that were placed in storage without shaking or stirring. The results shown in Table 3 indicate the dispersions to be stable in the critical period of up to 21 days during which the fuel is most likely to be transported and used.

TABLE 3

Long Term Stability of Undisturbed Samples

| Example | 3 day Sieve (% residue) | 7 day Sieve (% residue) | 14 day Sieve (% residue) | 21 day Sieve (% residue) | 28 day Sieve (% residue) |
|---|---|---|---|---|---|
| 2 | 0 | 0.1 | 0.2 | 0.1 | 5.2 |
| 4 | 0 | 1.6 | 0.4 | 0.8 | 3.1 |

EXAMPLE 5

Further experiments were performed to evaluate the difference in long term storage stability with and without a viscosity stabilizer. A sample of the asphaltene dispersion was prepared without the addition of a viscosity stabilizer into the surfactant solution before emulsification. Asphaltene #2 was melted in the drums using a drum heater belt and then poured into the asphaltene reservoir and heated to 224° C. in the colloid mill. The soap solution was prepared by first dissolving 0.5% Surfactant 2 in water at a temperature of about 65° C. The pH was adjusted between 1.7 to 1.9 with 36% hydrochloric acid. The soap solution was added to the soap reservoir and heated to 91° C. The pipes in the colloid mill were heated to 220° C. and the colloid mill was heated to about 90° C. When the temperatures reached steady conditions, the recirculating asphalt and soap pumps were started, and the mill was turned on, followed by passing the soap solution into the mill at a flow rate of 1–3 gpm. The mill gap was set to 0.015 inches to produce the same particle size distribution as in Example 1. Initially asphalt was introduced to the mill followed by introduction of the asphaltenes at a flow rate of 1–3 gpm. The dispersion was collected and then allowed to cool. Residue analysis determined the asphalt content to be 67%.

A portion of this sample was transferred to a 500 ml graduated cylinder. A 30% slurry of guar gum with diethylene glycol was prepared and was added to another sample of the dispersion at a dosage level of 0.05% guar gum by the weight of the emulsion with gentle stirring. This sample with the guar gum was transferred to another 500 ml graduated cylinder. Both samples were left standing at ambient conditions for 20 days. After 20 days samples were withdrawn at the 500, 400, 250, 100, 50, and 5 milliliter markings and analyzed for hydrocarbon content. An approximate 5 gram sample was placed in a metal weighing dish and weighed again. Water was evaporated by gentle heating over a hot plate and the sample was weighed. The test was performed on duplicate samples and the tests were repeated if there was more than 0.3% difference in asphaltene content between duplicates. The results are listed in Table 4. Differences in solid content in the sample taken from the top half of the graduated cylinder compared to the bottom half indicates that settlement has taken place. The results in Table 4 show that significant settlement of asphaltene particles has taken place in the sample without the guar gum compared to the one with the guar gum. For example, the solid content at the 50 milliliter marking for the sample without guar gum is about 6% higher compared to the sample with guar gum. This demonstrates significantly less stability.

TABLE 4

20 Day Stability Studies With and Without Guar Gum

| Sampling marking point in the graduated cylinder, milliliters | Hydrocarbon or asphaltene content | |
|---|---|---|
| | Dispersion without guar gum | Dispersion with 0.05% guar gum |
| 5 | 73.4 | 71.9 |
| 50 | 73.3 | 67.3 |
| 100 | 70.6 | 66.8 |
| 250 | 68.4 | 67.2 |
| 400 | 66.8 | 66.6 |

Further experiments were undertaken to study the handling, atomization, nozzle design and combustion behavior of microdispersed asphaltene-water emulsions and evaluate the combustion behavior in a down-fired, multi-fuel combustor. The emulsions employed comprised 68.5% Asphaltene #2 (as described in Table 1), 0.5% tallow diamine surfactant, 0.05% guar gum and the balance water. For comparison purposes, data was also obtained for #6 fuel oil.

Figure 2:
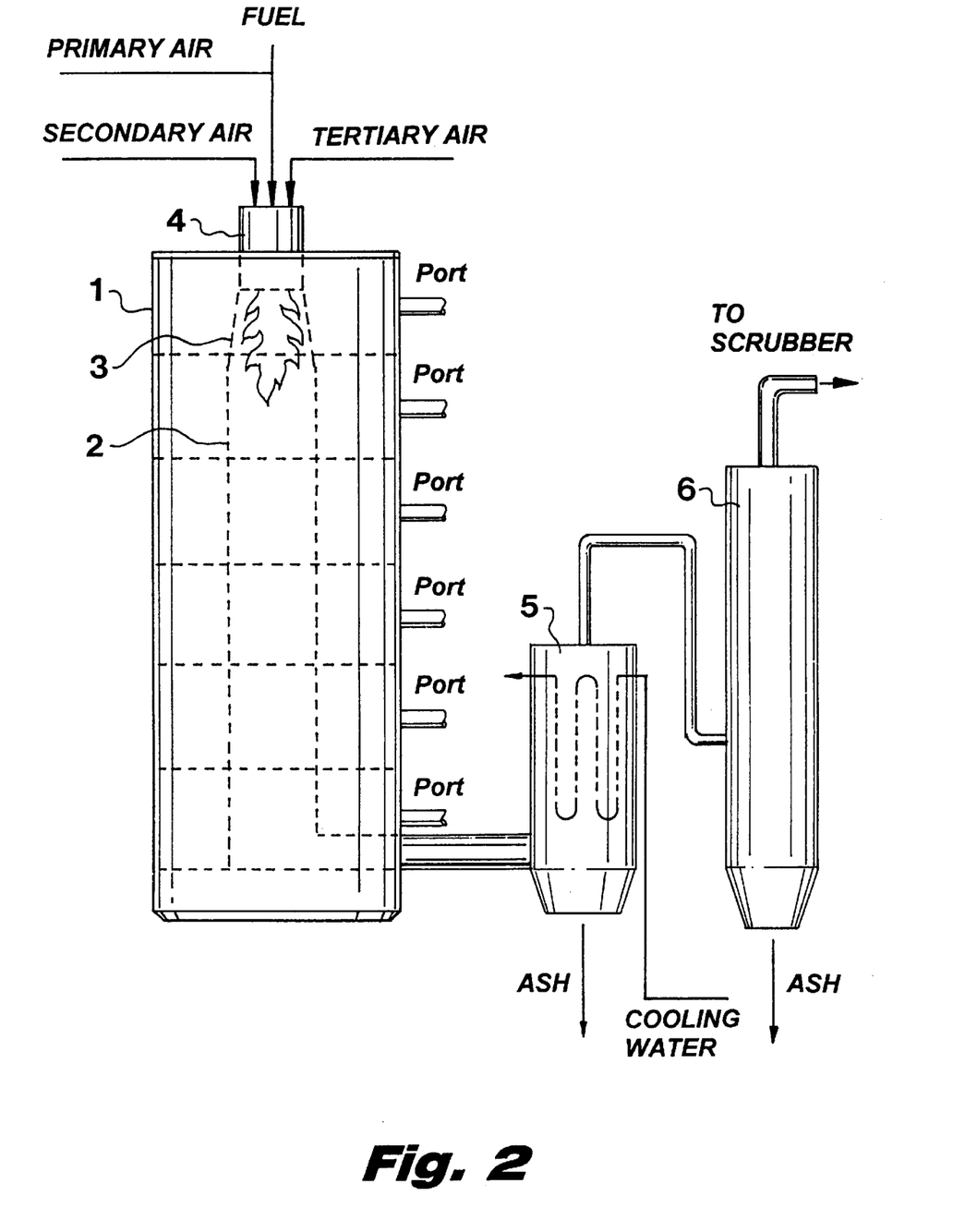
FIG. 2 is a drawing of a multi-fuel down-fired combustor.

The combustion behavior of the microdispersed asphaltene-water emulsions was evaluated in the multi-fuel down-fired combustor. As shown in FIG. 2, the combustor 1 has a 20 inch internal diameter 2, is 10 feet high, and is designed for a thermal input of 500,000 BTU/hr. (nominal), but this can be varied from 200,000 to 600,000 Btu/hr. The 10 foot high combustor is constructed in 6 modules, each of which can be removed to adjust the height, or replaced by a module containing high temperature ceramic tubes to study materials performance. Each module consists of five 18 inch tall and 16 inch diameter circular refractory sections. A divergent refractory cone 3, commonly called a quarl, is positioned on top of the five circular refractory sections. The divergent cone top has a half-angle of approximately ten degrees and is fitted with a multi-fuel burner 4 that is cooled with either an air or water jacket to preclude evaporation of water from the emulsions prior to the emulsions passing into the combustion area. The combustor is lined with a 3-inch thick refractory material to withstand temperatures up to 1,648° C., and an 8-inch thick light weight high alumina insulation layer to minimize heat loss and produce a flame temperature of between 1,450° C. and 1,500° C. The flue gases pass through a modular heat exchanger that cools them to about 100° C. before they exit. Gas samples can be extracted from any number of sampling ports located along the combustor or downstream of the combustor to continuously monitor $CO_2$, CO, $O_2$, $SO_2$, and $NO_x$ concentrations. Six 4-inch sampling ports are shown located along the combustor. Flue gas samples were extracted at the exit of the heat exchanger 5. Wall temperatures were monitored with type-S thermocouples at six locations along the combustor (not shown). Flue gas passed from the heat exchanger 5 to the bag house 6 and from there to a scrubber for final removal of ash.

Data on gas and air flows, blower speed, flame signal, wall temperature profile (6 locations), flue gas composition ($CO_2$, CO, $O_2$, $SO_2$, and $NO_x$) leaving the heat exchanger were recorded using a data acquisition system. The data is compiled in the following Table 5. The data shows that for the first time hard emulsions comprising a colloidal dispersion of hydrocarbon particles in water having a mean softening point in the dispersion exceeding about 95° C. can be pumped and burned in a manner comparable to a conventional fuel oil.

TABLE 5

Summary of the Combustion Conditions and Emission Performance

|  | #6 FUEL OIL | CATIONIC EMULSION (AIR COOOLED GUN) | CATIONIC EMULSION (WATER COOLED GUN) + NATURAL GAS | CATIONIC EMULSION (WATER COOLED GUN) EMULSION ONLY |
|---|---|---|---|---|
| T1, (°F.) | 2303.72 | 2259.41 | 1915.66 | 1744.11 |
| T2, (°F.) | 2486.89 | 2447.23 | 2089.36 | 2188.16 |
| T4, (°F.) | 2109.26 | 2136.10 | 2177.23 | 2216.30 |
| T5, (°F.) | 1945.19 | 2015.62 | 2039.04 | 2087.96 |
| T6, (°F.) | 1782.12 | 1900.05 | 1914.63 | 1962.00 |
| % $O_2$ | 4.51 | 3.97 | 2.76 | 2.87 |
| % $CO_2$ | 12.81 | 13.58 | 12.70 | 14.02 |
| ppm CO corrected to 3% $O_2$ | 79.54 | 39.68 | 96.66 | 55.39 |
| ppm $SO_2$ corrected to 3% $O_2$ | 681.41 | 2960.80 | 2069.32 | 3180.37 |
| ppm $NO_x$ corrected to 3% $O_2$ | 743.43 | 613.82 | 457.08 | 512.45 |
| Liquid Fuel Feed Rate (lb/hr) | 22.13 | 31.63 | 38.71 | 39.02 |
| Firing Rate | 0.40 | 0.36 | 0.70 | 0.44 |
| (mm Btu/hr) |  |  |  |  |
| Secondary Combustion Air (scfm) | 63.71 | 60.93 | 56.68 | 60.93 |
| Tertiary Combustion Air (scfm) | 0.00 | 0.00 | 47.79 | 0.00 |
| Cooling Air (scfm) | 6.57 | 6.57 | 6.57 | 6.57 |
| Atomizing Air (scfm) | 2.79 | 2.79 | 3.26 | 3.26 |
| Total Air (scfm) | 70.29 | 67.50 | 111.04 | 67.50 |

While the invention has been described with preferred embodiments, it is to be understood that variations and modifications are to be considered within the purview and the scope of the claims appended hereto.

What is claimed is:

1. A continuous process for preparing a fuel composition comprising a colloidal dispersion of high softening point hydrocarbon particles in water comprising:

(a) initiating and maintaining the flow of an aqueous solution of a dispersion agent having a temperature from about 80° C. to the boiling point of the solution through a high shearing action mixing device;

(b) introducing melted normal asphalt into said mixing device with said dispersion agent and mixing said melted normal asphalt with said dispersion agent in said mixing device so as to create an asphalt emulsion and removing said asphalt emulsion from said mixing device;

(c) creating a pressure at said outlet of said mixing device in excess of the vapor pressure of the emulsion;

(d) ceasing the introduction of said normal asphalt into said mixing device and in lieu thereof introduce hydrocarbons having a mean softening point in colloidal aqueous dispersion exceeding about 95° C. and heated above a temperature of about 200° C. into said mixing device with said aqueous solution of dispersion agent at a high rate of shear sufficient to produce highly dispersed hydrocarbon particles in water having a median particle diameter below about 4.5 microns and about 90% of the particles being below about 60 microns;

(e) mixing said heated hydrocarbons with said aqueous solution of dispersion agent and maintaining the mixture at a temperature of between from about 120° C. to about 170° C., so as to form a colloidal dispersion comprising petroleum hydrocarbon particles;

(f) cooling said dispersion to a temperature below about 90° C.; and (g) reducing the pressure to atmospheric.

2. The process of claim 1, wherein the hydrocarbon particles are substantially spherical.

3. The process of claim 1, wherein said hydrocarbon particles comprise about 55–75% by weight of said colloidal dispersion.

4. The process of claim 1, wherein the dispersion agent comprises a surfactant and a stabilizer.

5. The process of claim 4, wherein said surfactant is cationic.

6. The process of claim 4, wherein said surfactant is anionic.

7. The process of claim 5, wherein said cationic surfactant has the formula:

wherein
$R_1 = -C_{14-20}H_{24-40}, -C(O)C_{13-19}H_{22-38}$
$R_2 = -CH_3, -H, -CH_2CH_2OH$
$R_3 = -CH_3, -H, -CH_2CH_2OH$
$R_4 = -CH_3, -H$
m=2 or 3
n=0 to 4 the surfactant molecule having at least one alkyl substituent having a hydrocarbon chain having a chain length distribution between from 14 to 20 carbon atoms and at least one amine functionality which serves as a hydrophilic site in the molecule.

8. The process of claim 1, wherein said softening point is from about 95° C. to about 120° C.

9. The process of claim 1, wherein said dispersion agent comprises from about 0.2% to about 2% by weight of said dispersion.

10. The process of claim 1, wherein said hydrocarbon is selected from the group consisting of asphaltenes, Gilsonite asphalt blends, polymer modified asphalts and mixtures thereof.

11. The process of claim 1, wherein the pressure at said outlet of said mixing device is from about 85 psi, to about 120 psi.

* * * * *